United States Patent Office 3,319,725
Patented May 16, 1967

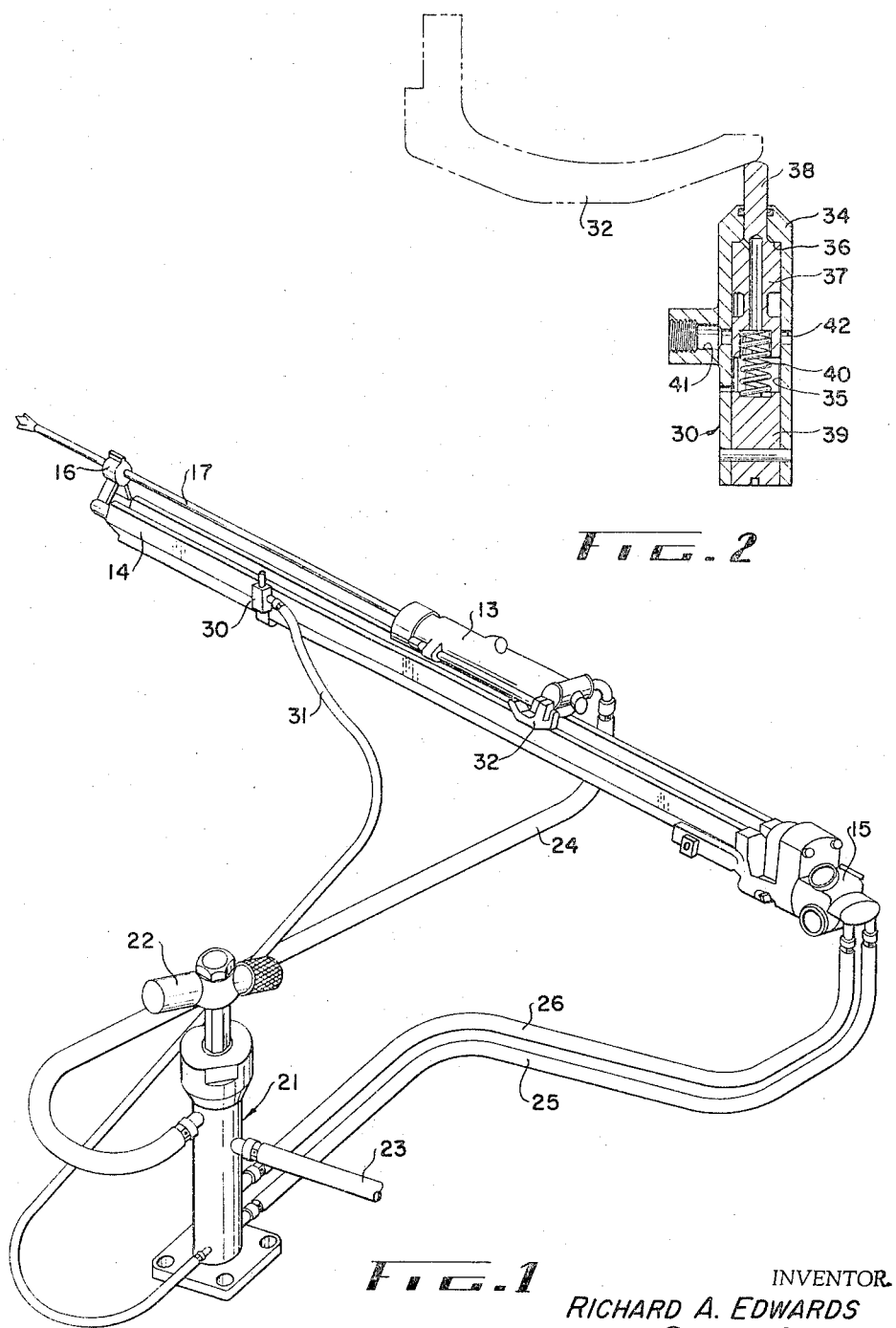

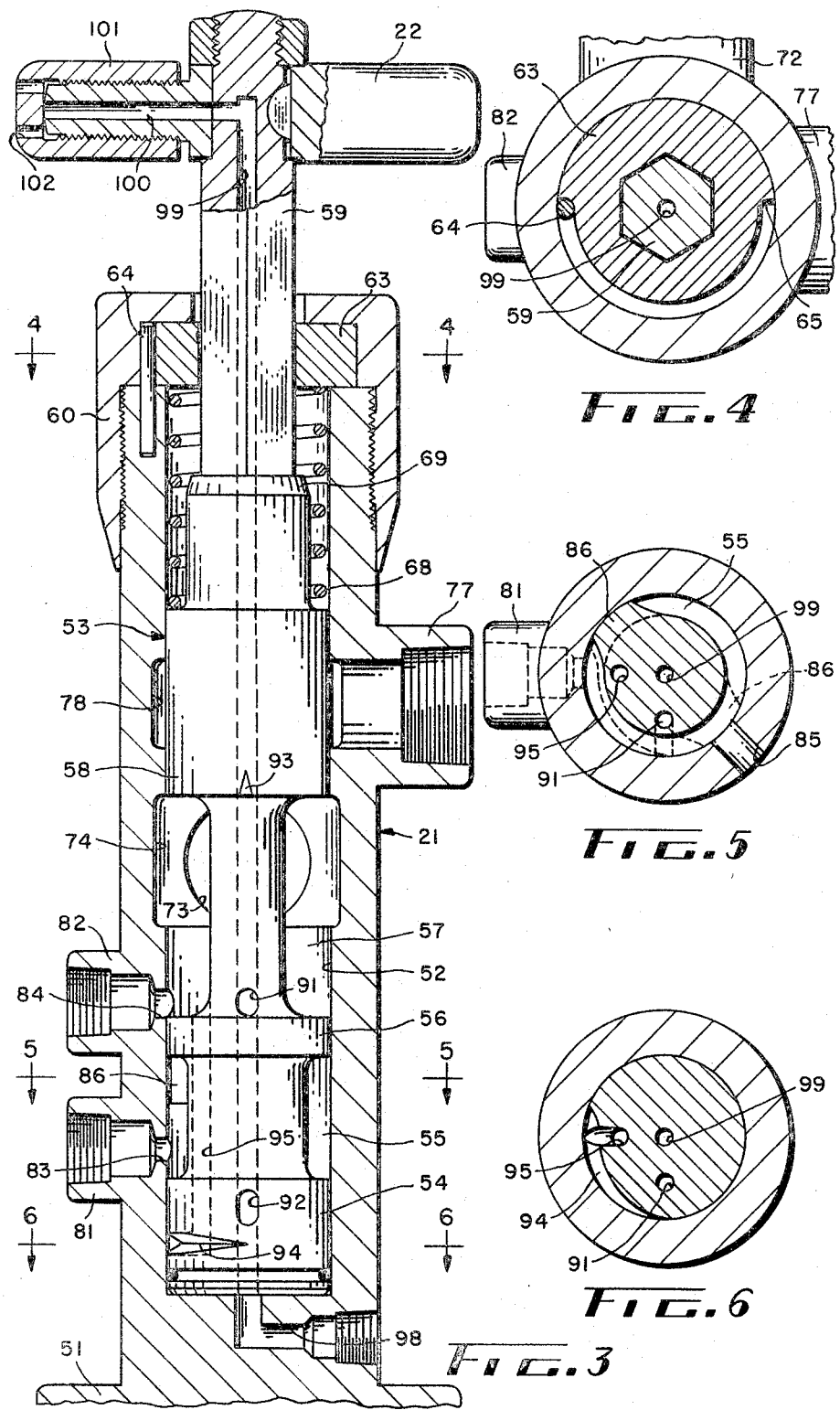

3,319,725
REMOTE CONTROL FOR ROCK DRILL
Richard A. Edwards, Denver, Colo., assignor to Gardner-Denver Company, a corporation of Delaware
Filed Feb. 28, 1966, Ser. No. 530,442
20 Claims. (Cl. 173—157)

This application is a continuation-in-part of application Ser. No. 440,577 filed Mar. 17, 1965 and now abandoned.

This invention relates to a remote control for a drifter type rock drill and, more particularly, to a remote and partially automatic control for the drill and feed motor for a drifter type rock drill.

In certain rock drilling operations, such as the drilling of a tunnel face or mine drift, mobile multidrill drilling rigs are frequently used. Such drills may carry two or three drifter type drills mounted on movable arms or booms whereby the drills are readily positioned by remote control relative to the work face. In the operation of the drills themselves, it has been necessary for the drill operator to closely follow the drilling of each hole so that he can shut off the drill motor and reverse the feed at the end of the drilling stroke, in order to prevent damage to the rock drill and/or its feed mounting. Therefore, to use the drills efficiently it has been necessary to provide an operator for each drill on a multidrill rig.

An object of this invention is to provide a control for a drifter type rock drill which automatically controls a portion of the drilling cycle so that a single operator may operate efficiently two or more rock drills.

Another object of this invention is to provide a control for a drifter type rock drill which automatically feeds the drill toward the work, shuts off or reduces the flow of air to the drill motor, and withdraws the drill from the work, and provides for manual control of the rate of feed toward the work.

A further object of this invention is to provide a remote control for a drifter type rock drill which provides for full manual control of the drill motor and feed motor for starting a hole, and which provides for automatic feed of the drill toward the work, shutoff or reduction of air flow to the drill motor, and withdrawal of the drill from the work.

A still further object of this invention is to provide a remote control for a drifter type rock drill which provides for automatic feed of the drill to the work, drill motor shutoff, and withdrawal of the drill from the work; and which provides for manual operation of the drill motor during withdrawal should conditions warrant.

In general, the invention is embodied in a main control valve and auxiliary valve for controlling, from a remote position, an air operated rock drill which is mounted on a suitable feed mounting and which is driven along the mounting by a reversible, air actuated feed motor. The main control valve consists of a single valve member movable axially and rotationally to control several functions. The valve member is normally urged axially to a first limiting position in which air is either prevented from flowing to the drill motor or such flow is restricted, and in which air is directed to the feed motor to either retract the drill or hold the drill in a retracted position. The valve member is movable manually away from the first limiting position to direct air to the drill motor for drilling and to direct air to the feed motor to feed the drill along the mounting. Continued manual movement of the valve member, axially to a second limiting position, results in the admission of air to the valve chamber to hold the valve member in this second limiting position. Manual rotation of the valve member in this position regulates the rate of feed. From this point, the drill cycle is automatic in that the feed motor will continue to feed the drill until an auxiliary trip valve on the feed mounting is actuated by the drill to vent the air from the valve chamber to effect return of the valve member to the first limiting position, to shut off or restrict air flow to the drill motor and to retract the drill.

The novel features of the invention, as well as additional objects and advantages thereof, will be understood more fully from the following description when read in connection with the accompanying drawings in which:

FIG. 1 is a diagrammatic showing of a drifter type rock drill and associated feed mounting, of a control valve and trip valve according to the present invention, and interconnecting air lines.

FIG. 2 is a sectional view of a trip valve which is attached to the feed mounting, including a showing of an actuator for the trip valve which may be attached to the rock drill.

FIG. 3 is a longitudinal sectional view of the control valve in position to retract the rock drill.

FIG. 4 is a transverse section taken along the line 4—4 of FIG. 3, looking in the direction of the appended arrows.

FIG. 5 is a transverse section taken along the line 5—5 of FIG. 3, looking in the direction of the appended arrows.

FIG. 6 is a transverse section taken along the line 6—6 of FIG. 3, looking in the direction of the appended arrows.

Figure 7:
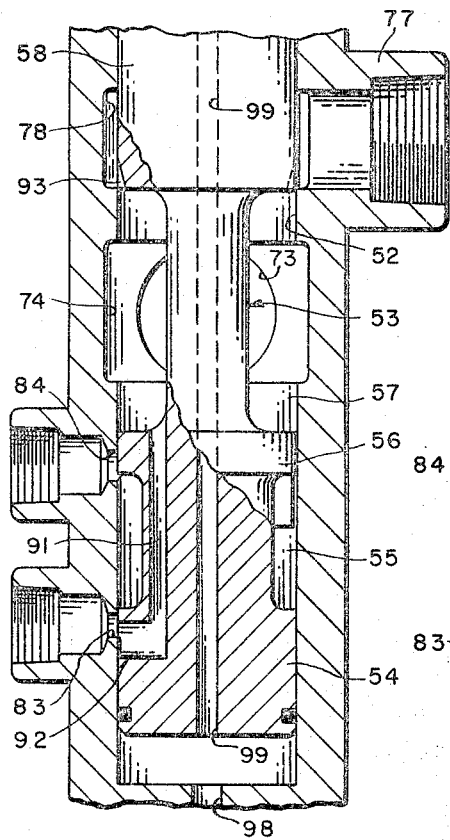
FIG. 7 is a partial longitudinal section of the control valve, showing the valve spool shifted axially and rotationally from the FIG. 3 position.

Referring to FIG. 1, there is shown a conventional drifter type rock drill 13 mounted on a conventional feed mounting 14, which consists of a guide shell having ways for slidably supporting the drill. A reversible air motor 15, shown as a radial piston type air motor, is mounted at the rearward end of the feed mounting 14 and drives a lead screw (not shown) which is rotatably supported within the feed mounting and extends substantially the full length of the feed mounting. This lead screw is in continuous engagement with a fixed nut attached to the drill. A drill rod centralizer 16 is mounted at the forward end of the feed mounting 14 for supporting a drill rod 17 carried in the drill 13. Rotation of the feed motor in one direction feeds the drill and drill rod toward the work face; and rotation of the feed motor in a reverse direction retracts the drill from the work face and withdraws the drill rod from the hole.

A main control valve 21 for controlling the operation of the drill motor and feed motor is diagrammatically shown in FIG. 1. This valve includes a single valve member having a T handle 22 which is grasped by the operator for controlling the manually controlled portions of a drilling cycle. The control valve is connected to a source of compressed air by a supply conduit 23, is connected to the rock drill motor by a conduit 24, and is connected to the feed motor 15 by a pair of conduits 25 and 26; all of the conduits preferably being in the form of flexible hoses.

When the valve is manually shifted to drilling position by the operator, the valve is held in this position by an air charge which is permitted to enter the valve chamber at one end of the valve. In order to return the valve to the retract position, the pressurized air must be vented from this chamber; and for this purpose there is provided a trip valve 30 which is mounted at a suitable position along the side of the feed mounting 14. This trip valve is connected to the main control valve chamber by means of a conduit 31, and serves to vent the one end of the main valve chamber when actuated. A trip valve actuator 32 consists of an arm which is rigidly attached to the rock drill 13 to engage the trip valve at the end of the drilling stroke. The position of the trip valve 30 on the drill mounting is selected to provide the desired hole depth.

FIG. 2 is a detail view of a trip valve 30 which may be used in the present invention. This valve includes a housing 34 having a through bore including a larger cylindrical portion 35 defining a valve chamber which terminates at one end in an annular shoulder 36, defining a smaller bore opening from that end. A valve member 37 is defined by a cylindrical body which is slidably received within the larger bore 35, and a stem 38 which extends through the smaller bore in the valve housing and projects therefrom. A spring retainer 39 is secured in the bore 35; and a spring 40, disposed between the spring retainer 39 and the valve member 37, normally urges the valve member against the shoulder 36 so that the stem 38 projects from the housing. The body of the trip valve member 37 is provided with an annular groove which, when moved axially against the force of the spring 40, communicates inlet port 41 with exhaust port 42. This vents the conduit 31, which is connected to the inlet port, and the chamber of the main control valve with which the conduit communicates. The trip valve 30 is mounted on the feed mounting 14 in any desired manner; and FIG. 2 also shows the relation of the valve actuator 32 which is suitably mounted on the rock drill 13.

The structure and operation of one form of main control valve 21 are illustrated in FIGS. 3 through 9. The main control valve includes a generally cylindrical housing having a base flange 51 for the purpose of mounting the valve housing on a suitable support, and which identifies the lower end of the valve for the purpose of the following description. The housing is provided with several projecting bosses having internally threaded bores for the purpose of attaching certain air hoses to the housing. The housing is provided with a cylindrical bore 52, defining a valve chamber, opening from the upper end thereof and terminating short of the base. This chamber is dimensioned to accommodate a spool valve 53 for axial and rotational movement. The spool valve includes lower, center and upper lands 54, 56 and 58, respectively; the lands 54 and 56 being separated by an annular groove 55, the lands 56 and 58 being separated by an annular groove 57. A stem 59, including a portion of hexagonal cross section, extends upwardly from the upper land 58; and valve handle 22 is rigidly secured to the upper end of the stem 59 by means of a suitable key and nut. The upper end of the valve housing is closed by a cap 60 provided with an opening through which the stem 59 passes.

In order to limit the rotation of the spool valve 53 within the valve housing, a disclike index plate 63, best shown in FIGS. 3 and 4, is confined within the cap 60 and rides on the top of the valve housing. This plate is provided with a hexagonal bore which receives the hexagonal stem of the spool valve 53, permitting axial movement of the spool valve relative to the plate and rotationally keying the plate to the stem. Substantially one-half of the periphery of the index plate is of reduced diameter, defining a space to accommodate an index pin 64 extending upwardly from a suitable bore in the housing wall, and defining shoulders 65 spaced generally opposite each other to limit the rotation of the index plate and the spool valve to 180°. In FIG. 3, the spool valve is rotated to the counterclockwise limit, as viewed from the top of the valve.

The normal axial position of the spool valve 53 is shown in FIG. 3; and the valve is held in this position by a coil spring 68 which bears against the upper shoulder of the valve land 58 and against the lower face of the index plate 63. The spool valve is movable upwardly by an operator raising the handle 22; and this upward movement is limited by engagement of a shoulder 69 on the valve stem with the lower face of the index plate 63.

The supply connection for the control valve 21 is provided by boss 72 (FIG. 4) having an internally threaded opening 73 in which the supply conduit 23 is attached, and which opens to an internal annular groove 74 in the valve chamber 52. In all positions of the spool valve, the annular groove 57 of the spool valve is in communication with the chamber groove 74 so that the annular groove 57 with the housing defines a supply chamber.

The drill motor conduit 24, which supplies air from the control valve to the rock drill motor, is connected to the valve at boss 77 provided with an internally threaded passage communicating with internal annular groove 78 in the valve chamber 52. The groove 78 defines a drill motor supply port cooperating with the land 58 of the spool valve. It will be seen that the drill motor supply port 78 is closed by the land 58, in the normal position of the valve, to prevent air flow to the drill motor.

The feed motor hoses 25 and 26 are connected respectively at bosses 81 and 82, the boss 81 having an internally threaded passage opening into the valve chamber defining a feed port 83, and the boss 82 having an internally threaded passage opening into the valve chamber defining a retract port 84. Referring to FIG. 3, it will be seen that the retract port 84 is in communication with the supply chamber 57 so that air is directed to the feed motor 15 tending either to retract the drill 13 or to hold the drill in a retracted position against a suitable stop provided on the feed mounting. The feed port 83, in this position of the valve, defines an exhaust port for secondary exhaust from the motor 15. In the FIG. 3 position of the spool valve, the port 83 communicates with an exhaust chamber, which is defined by the annular groove 55 of the spool valve and the valve housing. As best shown in FIG. 5, an exhaust port 85 in the housing wall communicates the exhaust chamber 55 with atmosphere. The axial position of the exhaust port 85 is indicated by the plane in FIG. 3 through which FIG. 5 is taken; and it will be seen that the port 85 and the exhaust chamber 55 are in communication for all axial positions of the spool valve.

When the control valve is connected to air supply and the spool valve is in the FIG. 3 position and the drill 13 is fully retracted, there may be some leakage of air through the feed motor which exhausts from the exhaust port 85 resulting in objectionable noise. Accordingly, closure means is provided to close this exhaust port 85 when desired. This closure means consists of a boss 86 on the control valve, best shown in FIGS. 3 and 5, which is defined by a radial projection into the valve groove 55 and a downward extension of the cylindrical valve surface defined by the center land 56. When the spool valve 53 is rotated to the clockwise limiting position, and while the valve is in its lowermost position as shown in FIG. 3, the boss 86 will cover the exhaust port 85 as shown in phantom in FIG. 5. This boss is positioned so that it will not interfere with other ports in the valve housing.

The operation of the control valve will now be described with reference to other structural features of the valve which are best explained in relation to the functions they perform.

In the drilling of many holes it is either necessary or desirable to collar or start the hole, which consists of initially providing a surface which is normal to the direction of the feed of the rock bit and which will prevent the bit from tending to drift from the line of feed. This is accomplished by initial chipping of the rock face with the drill bit through close control of the feed and drill motor by the operator; and one of the features of the present control is the means by which this hole starting is controlled. The general position of the spool valve 53 for the hole starting operation is shown in FIG. 7. Referring particularly to FIGS. 3 and 7, there is shown a hole starting feed passage 91, in the spool valve 53, including a longitudinal portion which opens to the supply groove 57 and a radial portion defining an axially elongated port 92 in the periphery of the lower land 54. To position the valve in the hole starting position, the valve is pulled manually and rotated 90° clockwise from the FIG. 3 position, by the operator, to align the port 92 with the fed port 83; and the valve must be held by the operator against the force of the spring 68 to maintain this axial position. This axial shifting of the spool valve has communicated the retract port 84 with the exhaust chamber 55, to provide for operation of the feed motor 15 in a direction to feed the rock drill forward. Now, through manual oscillation of the spool valve through a few degrees, the ports 92 and 83 may be intermittently communicated to provide the desired control of feed.

Also, as seen in FIG. 7, the lower shoulder of the spool valve land 58 lies generally in the plane of the lower wall of the annular groove 78 which communicates with the drill motor conduit 24. A pair of V notches 93 are provided in the cylindrical surface of the valve land 58, communicating with the lower shoulder, to provide for a very small flow of air from the supply chamber 57 to the annular groove 78 when desired, to provide for extremely throttled down operation of the drill motor. Slight upward movement of the spool valve will, of course, increase the flow of air to the drill motor; and slight reciprocating axial movement of the spool valve by the operator will provide very close throttling control of the drill motor. It will be seen, then, that the operator can closely control the rock drill, for hole starting, through slight axial reciprocation of the valve for drill motor control and through slight rotary oscillation of the valve for feed motor control. Should it be necessary during this hole starting operation to retract the drill, it is only necessary to permit the spool valve to move axially downward until the supply chamber 57 is communicated with the retract port 84. When the hole starting feed port 92 is in full communication with the feed port 83, the maximum flow of feeding air permitted by the valve is effected.

Figure 8:
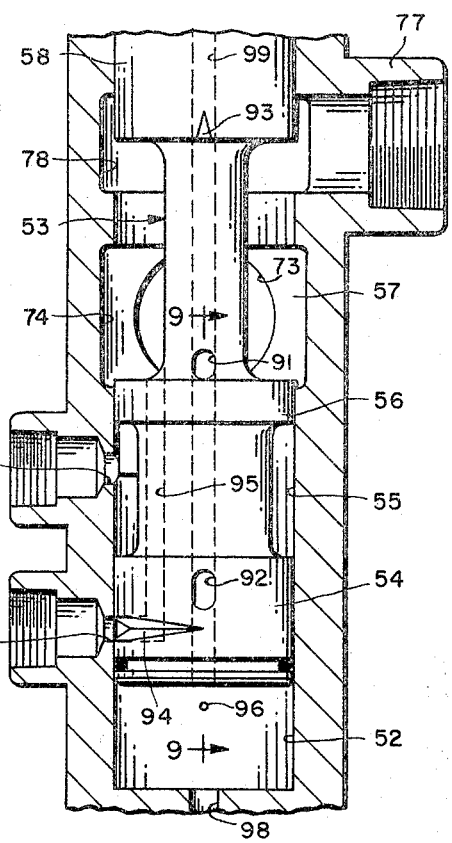
FIG. 8 is a partial longitudinal section of the control valve, showing the valve spool shifted axially further from the FIG. 3 position but in the same rotational position.

Once the hole has been started, the remainder of the drilling cycle is effected by manually pulling the spool valve to its upper limiting position, as shown in FIG. 8, wherein the valve shoulder 69 engages the index plate 63 (FIG. 3). In this position, maximum flow of air is directed from the supply chamber 57 through the drill motor supply hose 24 so that the rock drill 13 operates at full throttle. If the rock drill 13 is provided with a throttle valve, this valve will be positioned and left at the full throttle position or some other position as indicated by the drilling conditions. Also, in this axial position of the spool valve 53 a feed throttle groove 94, best shown in FIGS. 3, 6 and 8, is aligned axially with the feed port 83 of the valve chamber. The feed throttle groove 94 is a V groove which is milled into the periphery of the lower spool valve land 54, extending angularly around the land 90° and gradually diminishing from a maximum section at one end of the groove to a minimum section at the other end. The feed throttle groove 94 is communicated with the supply chamber 57 by means of a supply passage 95 consisting of a longitudinal portion which is always open to the spool valve supply groove 57, and a radial portion opening to the groove 94. The spool valve is shown rotated to the full throttle position in FIG. 8 and FIG. 3, which is the counterclockwise limiting position of valve rotation as seen in FIG. 4. Rotation of the spool valve 90° clockwise from the full throttle position will reduce the feeding air from maximum to minimum; and further clockwise rotation will, of course, shut off the flow of feeding air.

Figure 9:
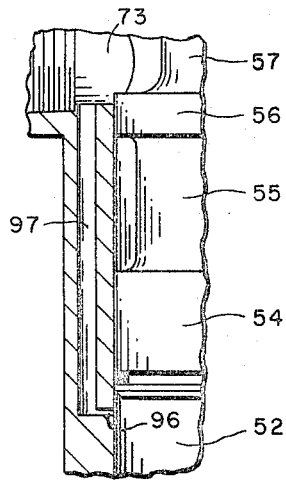
FIG. 9 is a fragmentary longitudinal section taken along the line 9—9 of FIG. 8, looking in the direction of the appended arrows.

When the spool valve is moved to the drilling position shown in FIG. 8, the lower end of the valve uncovers a restricted bleed port 96, which is in continuous communication with supply passage 73 by means of a longitudinal passage 97, as best shown in FIGS. 8 and 9. When this bleed port 96 is uncovered by the spool valve, the valve chamber 52 below the valve is pressurized to hold the valve in the drilling position against the force of the spring 68. Therefore, when the operator pulls the spool valve manually to the drilling position, the valve will automatically hold this position until the holding air is released. Simultaneously with the axial movement of the valve to the drilling position, the experienced operator will rotate the valve to select the desired feed rate; and the remainder of the drilling cycle will then proceed automatically as will now be described.

At the lower end of the valve housing there is provided a passage 98 which communicates with the lower end of the valve chamber 52 and with a threaded opening in the valve housing wall to which is attached the trip valve conduit 31. The feeding of the drill toward the work, then, will continue until the stem 38 of the trip valve 30 is engaged by the trip valve actuator 32, mounted on the rock drill, to vent the conduit 31 and, therefore, the valve chamber beneath the spool valve 53. The pressure in the chamber is reduced since air flow through the vent path is greater than the flow of supply air through the restricted port 96. When this occurs, the spring 68 will immediately return the spool valve to its lower position shown in FIG. 3, closing the port 96. In this position, of course, the supply of air to the rock drill motor is immediately shut off by the valve land 58, and the retract port 84 is again communicated with the supply chamber 57 so that the feed motor 15 retracts the drill from the work face and withdraws the drill rod 17 from the hole which is now completed.

The control valve provides an alternative means to vent the chamber below the spool valve 53 for the purpose of returning the valve to the normal position and to retract the rock drill at the will of the operator. This provides a safety feature in the event of drill rod breakage or other emergency situation. The alternative vent path is provided by an axial passage 99 extending through the spool valve 53 to a point short of the stem end of the spool valve, and communicating with a passage 100 extending through one end of the T handle 22. The passage 100 opens to the end of the handle which defines a valve seat. This one end of the handle is externally threaded to accommodate an axially elongated cap 101 which defines a relief valve closure member, the closed end thereof sealing the opening from the passage 100. The end wall of the valve cap 101 is provided with ports 102 to vent the passages 100 and 99 when the valve cap is unseated from the valve seat. This, of course, vents the valve chamber below the valve to effect return of the valve to the FIG. 3 position. The surface of the valve cap 101 may be knurled to facilitate its operation.

During the retraction of the drill and the withdrawal of the drill rod from the hole, the rod may become bound in the hole, requiring manual operation of the drill to free it. This is readily accomplished through manual operation of the control valve to actuate the drill motor and to reverse the feed if necessary. During this operation, it may be desirable to open the relief valve 101 so that the spool valve 53 will not lock in the drilling position should the bleed port 96 be exposed.

FIGS. 10 through 14 illustrate a main control valve 21' which is generally similar to the above described main valve 21 in structure and operation, but which is modified to provide restricted flow of air to the drill motor while the drill is retracted on the feed mounting. In certain drilling operations, this feature is desirable to reduce the possibility of the drill bit becoming bound in the hole. In the description of this modified valve, the same reference numbers will be used where the parts are identical to the valve of FIGS. 3 through 9.

Figure 10:
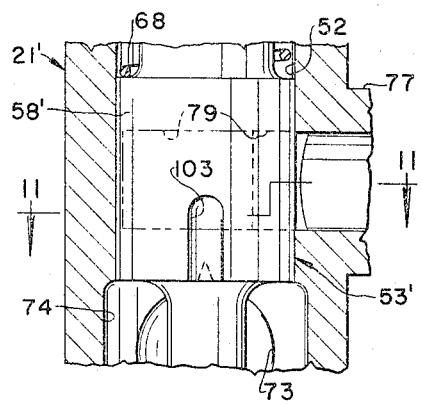
FIG. 10 is a fragmentary longitudinal sectional view of a modified form of the valve shown in FIGS. 3 through 9, the position of the valve member within the valve chamber corresponding to that of FIG. 3.
Figure 11:
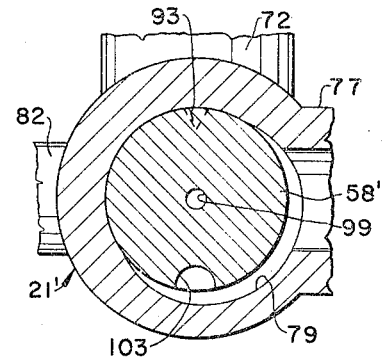
FIG. 11 is a transverse section taken along the line 11—11 of FIG. 10, looking in the direction of the appended arrows.

FIGS. 10 and 11 show the spool valve 53' in its normal axial position (corresponding to FIG. 3); the valve being urged to this position by the spring 68. These figures particularly show the drill motor supply port which is now defined by a partial annular groove 79 which communicates with the passage in the boss 77 to which the drill motor conduit 24 is attached. The valve land 58', of the spool valve 53', is provided with a longitudinal groove 103 which communicates with the lower shoulder of the valve land 58' and extends upward for a distance sufficient to communicate with the groove 79.

In FIGS. 10 and 11, the valve 53' is shown at its counterclockwise rotational limit; and it will be seen with particular reference to FIG. 11 that the groove 103 will communicate with the groove 79 in rotational positions of the valve between this counterclockwise limit and a position approaching 90° of clockwise rotation. This is the range of rotation of the valve for control of the rate of feed as described above; therefore, regardless of the rotational position of the spool valve 53' for the desired feed rate, when the valve is returned to its normal position reduced air flow will be provided to the drill motor to operate the drill motor while the drill bit is withdrawn from the hole.

Figure 12:
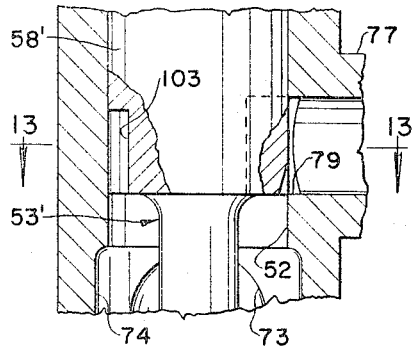
FIG. 12 is a fragmentary longitudinal sectional view of the valve of FIG. 10, corresponding to FIG. 7 in regard to the relative position of the valve member within the valve chamber.
Figure 13:
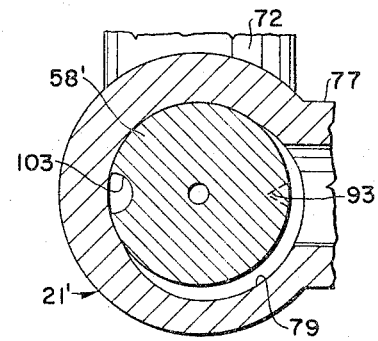
FIG. 13 is a transverse section taken along the line 13—13 of FIG. 12.
Figure 14:
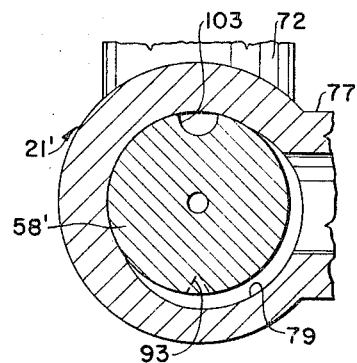
FIG. 14 is a transverse section, corresponding to that of FIG. 11 but showing the valve member in a different rotational position.

FIGS. 12 and 13 illustrate the collaring position of the spool valve 53' (corresponding to FIG. 7), wherein the position of the spool valve 53' is manually controlled both axially and rotationally for control of the drill motor and feed motor. It will be seen that the groove 103 is out of communication with groove 79, so that the control of restricted air flow to the drill motor is now provided by the single V notch 93 cooperating with the partial annular groove 79.

When the above described modified control valve 21' is employed, the drill motor will continue to hammer at the completion of each drilling cycle, since the groove 103 is in communication with the groove 79. If it is desired to stop the drill motor, the spool valve 53' is rotated to its clockwise limit, illustrated in FIG. 14, wherein the groove 103 is rotationally out of communication with the groove 79 thereby shutting off the flow of air to the drill motor. In this position, the valve boss 86 is rotated to close the exhaust port 85 to prevent leakage of air through the feed motor, as described above.

A feature of the above described control is that an experienced operator may, in one movement of the spool valve 53, start the drill cycle and set the feed rate, and the remainder of the drill cycle will be completed automatically. That is, the operator will start the cycle by pulling on the handle 22 and, at the same time, rotating the handle to set the appropriate feed rate. Further, if the feed rate needs adjusting at any time during the drilling, the handle 22 need only be rotated in one direction or the other to either increase or decrease the rate of feed.

Another feature of the control valve is the provision of full manual control of both the drill motor and the feed motor for starting or collaring the hole, should this be necessary.

Another feature of the control is the provision of the relief valve 101 by means of which the operator may effect retraction of the rock drill at any time during the feeding portion of the drilling cycle. Still another feature of the control is that the operator may readily take over manual operation of the control valve during the retract portion of the drilling cycle, to actuate the drill motor and reverse the feed motor if this is necessary to free the drill rod, for example.

What is claimed is:

1. A control system for a rock drill and feed assembly including a drill feed mounting, a rock drill supported on said mounting for reciprocating movement and having a fluid actuated drill motor, and a reversible fluid actuated feed motor for moving said drill along said mounting, characterized by:

a main valve comprising a housing, defining a valve chamber, and a valve member disposed in said chamber; said housing having ports opening into said chamber including a supply port for communication with a source of pressure fluid, a motor port for communication with said drill motor, a feed for port for communication with one side of said feed motor, and a retract port for communication with the other side of said feed motor; means projecting from said housing for manually actuating said valve member;

means urging said valve member to a first position wherein said valve member communicates said supply port with said retract port to effect retraction of said drill along said mounting; said valve member being movable to a second position wherein said valve member communicates said supply port with said motor port to actuate said drill motor, and with said feed port to effect feed of the drill along said housing;

means for directing pressure fluid to said valve chamber to hold said valve in said second position;

an auxiliary valve communicating with said main valve chamber and mounted to be actuated in response to predetermined feed movement of said drill along said mounting; said auxiliary valve, when actuated, venting said main valve chamber to effect the shifting of said main valve member to said first position.

2. The invention set forth in claim 1 wherein said main valve member, in said first position, provides restricted communication between said supply port and said motor port to provide for throttled down operation of said drill motor.

3. The invention set forth in claim 1 wherein said main valve member is a spool valve movable axially between said first and second positions; and wherein said means for directing pressure fluid to said valve chamber is a restricted port in said chamber wall communicating with said supply port and position to be exposed by said spool valve in said second position.

4. The invention set forth in claim 3 wherein said spool valve has port means axially aligned with said housing feed port in said second position, and coacting with said housing feed port in response to limited oscillation of said spool valve to regulate the flow of pressure fluid to said feed motor.

5. The invention set forth in claim 3 wherein said spool valve has a recess continuously communicating with said supply port and defining a supply chamber;

said spool valve having an angularly extending feed port communicating with said supply chamber; said valve feed port being axially aligned with said housing feed port in said second position of said valve, and said feed ports coacting in response to rotation of said spool valve to regulate the flow of pressure fluid to said feed motor.

6. The invention set forth in claim 3 wherein said spool valve has a recess continuously communicating with said supply port and defining a supply chamber; said supply chamber being in direct and full communication with said motor port in said second position of said spool valve, and said supply chamber being axially displaced from said motor port in said first position of said spool valve.

7. The invention set forth in claim 6 wherein said spool valve, in said first position, provides a restricted flow path for pressure fluid between said supply chamber and said motor port, to effect operation of said drill motor at reduced throttle.

8. The invention set forth in claim 3 wherein a manual control handle is rigidly attached to one end of said spool valve, defining said means projecting from said housing;

said spool valve and handle having a passage opening from said handle and opening from the other end of said spool valve to communicate with said valve chamber; and manually operated closure means on said handle for selectively opening said passage to vent said valve chamber, said closure means defining an alternative valve means for venting said valve chamber to effect the shifting of said spool valve to said first position.

9. The invention set forth in claim 1 wherein said valve member is movable to an intermediate position to provide manually controlled restricted communication of said supply port with said motor port and with said feed port.

10. The invention set forth in claim 3 wherein said spool valve is provided with a radially opening feed port communicating with said supply chamber;

said spool valve being movable to an intermediate axial position wherein said supply chamber begins to communicate with said motor port and wherein said valve feed port is axially aligned with said housing feed port; said spool valve, in said intermediate position, providing for manual regulation of fluid flow to said drill motor and to said feed motor through slight manual reciprocation and oscillation of said spool valve, respectively.

11. A remote control valve for use with a drifter type rock drill mounted on a feed mounting for reciprocating movement by a reversible feed motor, said control valve comprising:

a housing defining a valve chamber; a valve member disposed in said chamber; means projecting from said housing for manually actuating said valve member;

said housing providing individual port means opening into said valve chamber defining a supply port for communication with a source of pressure fluid, a motor port for communication with a drill motor, a feed port for communication with one side of a reversible feed motor to effect feed of a drill, and a retract port for communication with the other side of the reversible feed motor to effect retraction of the drill;

said valve member having a recess defining a supply chamber in continuous communication with said supply port, and having a throttling port communicating with said recess;

said valve member occupying a first position wherein said supply chamber is communicated with said retract port; and said valve member occupying a second position wherein said supply chamber is communicated with said motor port and wherein said throttling port is communicated with said feed port.

12. The invention set forth in claim 11 wherein said valve member, in said first position, provides restricted communication between said supply chamber and said motor port to provide for restricted fluid flow through the motor port to a drill motor.

13. The invention set forth in claim 11 wherein said valve member is a spool valve movable axially between said first and second positions; wherein said means for actuating said valve member is a stem extending axially from said spool valve;

and wherein said throttling port is axially aligned wtih said feed port in said second position, said throttling port coacting with said feed port in response to limited oscillation of said spool valve to regulate the flow of pressure fluid through said feed port.

14. The invention set forth in claim 13 wherein said throttling port comprises a partial annular groove of varying section.

15. The invention set forth in claim 13 including: means urging said valve member to said first axial position; said valve member being movable to said second axial position against the force of said urging means;

means for holding said valve member in said second axial position; and means for releasing said valve holding means to effect the shifting of said valve member to said first axial position.

16. The invention set forth in claim 13 including: spring means urging said valve member to said first axial position;

a restricted port in said housing opening to said valve chamber adjacent one end thereof and communicating with said supply port; said restricted port being closed by said valve member in said first axial position, and being exposed by said valve member in said second axial position to effect the pressurization of said one end of said valve chamber to hold said valve member in said second position agianst the force of said spring means;

and means for venting said one end of said chamber to effect the shifting of said valve member to said first position by said spring means.

17. The invention set forth in claim 16 including: a control handle secured to said valve member stem; said venting means comprising passage means in said valve member and said handle, opening to said one end of said chamber and opening from said handle; and closure means on said handle for selectively opening said passage.

18. The invention set forth in claim 13. wherein said supply chamber is in direct and full communication with said motor port in said second position of said valve member, and wherein said supply chamber is axially displaced from said motor port in said first position of said valve member.

19. The invention set forth in claim 18 wherein said valve member, in said first position, provides a restricted flow path for pressure fluid between said supply chamber and said motor port, to effect operation of said drill motor at reduced throttle.

20. The invention set forth in claim 13 wherein said valve member is provided with a radially opening feed port communicating with said supply chamber;

said valve member being movable to an intermediate axial position, between said first and second positions, wherein said supply chamber begins to communicate with said motor port and wherein said valve feed port is axially aligned with said housing feed port; said valve member, in said intermediate position, providing for manual regulation of fluid flow through said motor port and through said housing feed port through slight manual reciprocation and oscillation of said spool valve, respectively.

References Cited by the Examiner

UNITED STATES PATENTS

| | | | |
|---|---|---|---|
| 1,425,613 | 8/1922 | Stage | 173—19 |
| 3,055,393 | 9/1962 | Weaver | 137—625.17 |
| 3,162,250 | 12/1964 | Sindelar | 173—12 |
| 3,204,706 | 9/1965 | Jonsson | 173—19 |
| 3,266,580 | 8/1966 | Clapp et al. | 173—159 |

FRED C. MATTERN, Jr., *Primary Examiner.*

L. P. KESSLER, *Assistant Examiner.*